US 8,001,605 B2

(12) United States Patent
Padmanabhan et al.

(10) Patent No.: US 8,001,605 B2
(45) Date of Patent: Aug. 16, 2011

(54) METHOD AND SYSTEM FOR DETECTING A COMMUNICATION PROBLEM IN A COMPUTER NETWORK

(75) Inventors: Venkata N. Padmanabhan, Bangalore (IN); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 12/193,277

(22) Filed: Aug. 18, 2008

(65) Prior Publication Data

US 2008/0320152 A1  Dec. 25, 2008

Related U.S. Application Data

(62) Division of application No. 10/246,156, filed on Sep. 18, 2002, now abandoned.

(51) Int. Cl.
  *G06F 11/22* (2006.01)
(52) U.S. Cl. ............. 726/25; 726/22; 726/34; 713/189; 709/224; 709/229; 709/238
(58) Field of Classification Search .................. 726/22, 726/23, 25, 34; 713/187–189; 709/224, 709/227–230, 238, 239
  See application file for complete search history.

(56) References Cited

U.S. PATENT DOCUMENTS

| | | | |
|---|---|---|---|
| 5,473,691 A | 12/1995 | Menezes et al. | |
| 5,511,122 A * | 4/1996 | Atkinson | 713/153 |
| 5,673,319 A | 9/1997 | Bellare et al. | |
| 5,729,608 A | 3/1998 | Janson et al. | |
| 5,778,065 A | 7/1998 | Hauser et al. | |
| 5,850,449 A | 12/1998 | McManis | |
| 5,892,904 A | 4/1999 | Atkinson et al. | |
| 6,021,403 A | 2/2000 | Horvitz et al. | |
| 6,151,679 A | 11/2000 | Friedman et al. | |
| 6,233,570 B1 | 5/2001 | Horvitz et al. | |
| 6,321,338 B1 | 11/2001 | Porras et al. | |
| 6,363,056 B1 | 3/2002 | Beigi et al. | |
| 6,367,012 B1 | 4/2002 | Atkinson et al. | |
| 6,418,472 B1 * | 7/2002 | Mi et al. | 709/229 |
| 6,425,004 B1 * | 7/2002 | Hardjono | 709/223 |
| 6,453,345 B2 | 9/2002 | Trcka et al. | |
| 6,484,203 B1 | 11/2002 | Porras et al. | |
| 6,499,107 B1 | 12/2002 | Gleichauf et al. | |
| 6,538,997 B1 * | 3/2003 | Wang et al. | 370/241 |
| 6,539,479 B1 | 3/2003 | Wu | |
| 6,654,882 B1 | 11/2003 | Froutan et al. | |
| 6,996,712 B1 * | 2/2006 | Perlman et al. | 713/161 |

(Continued)

OTHER PUBLICATIONS

Padmanabhan et al., "Secure Traceroute to Detect Faulty or Malicious Routing", ACM SIGCOMM Computer Communications Review, vol. 33, No. 1, Jan. 2003, pp. 77-82.

(Continued)

*Primary Examiner* — Zachary A Davis
(74) *Attorney, Agent, or Firm* — Wolf, Greenfield & Sacks, P.C.

(57) ABSTRACT

A computer in a network runs a verification procedure in which it sends data packets to another computer in the network. Some or all of the data packets contain, either individually or collectively, a secret piece of information, such as a secret code. The computer then makes a determination regarding the network links between it and the other computer. If, for example, the other computer is able to respond by providing the secret piece of information back, then the computer sending the data packets concludes that the devices along the network links en route to the other computer are properly forwarding data packets.

8 Claims, 5 Drawing Sheets

U.S. PATENT DOCUMENTS

| | | | |
|---|---|---|---|
| 6,996,843 | B1 | 2/2006 | Moran |
| 7,017,186 | B2 | 3/2006 | Day |
| 7,089,428 | B2 | 8/2006 | Farley et al. |
| 7,096,359 | B2 * | 8/2006 | Agrawal et al. ............... 713/168 |
| 7,134,141 | B2 | 11/2006 | Crosbie et al. |
| 7,246,238 | B2 * | 7/2007 | Mullen et al. ................ 713/175 |
| 7,590,855 | B2 * | 9/2009 | Irwin ............................ 713/181 |
| 2002/0035628 | A1 | 3/2002 | Gil et al. |
| 2003/0018908 | A1 | 1/2003 | Mercer et al. |
| 2003/0028803 | A1 | 2/2003 | Bunker et al. |
| 2003/0033403 | A1 | 2/2003 | Rhodes |
| 2003/0051026 | A1 | 3/2003 | Carter et al. |
| 2003/0055962 | A1 | 3/2003 | Freund et al. |
| 2003/0074357 | A1 | 4/2003 | Nielsen et al. |
| 2003/0163569 | A1 | 8/2003 | Panasyuk et al. |
| 2003/0163729 | A1 | 8/2003 | Buchegger |
| 2003/0188189 | A1 | 10/2003 | Desai et al. |
| 2004/0049585 | A1 | 3/2004 | Swander |
| 2004/0054807 | A1 | 3/2004 | Harvey et al. |
| 2004/0064725 | A1 | 4/2004 | Padmanabhan et al. |

OTHER PUBLICATIONS

Mahajan, Ratual, et al., "*Understanding BGP Misconfiquration*", in proceedings of SIGCOMM'02, Aug. 19-23, 2002, Pittsburgh, Pennsylvania (14 pages).

Mahajan, Ratual et al., "*Towards operator fault-tolerant inter-domain routing*", Slide presentation, University of Washington, (15 pages), 2002.

Anderson, Tom, et al., "*Enforceable Network Protocols*", Slide Presentation, DARPA FTN PI Meet, Jan. 16, 2002 (10 pages).

Mahajan, Ratual et al., "*A study of BGP Misconfiquration*" Slide presentation, University of Washington, (27 pages).

Mahajan, Ratul, et al., "A Study of BGP Origin as Changes and Partial Connectivity", Slide Presentation, University of Washington, Asta *Networks*, (ritual@cs.washington.edu) (22 pages), Oct. 2001.

Wetgerall, David, et al., "*BGP: A Surprisingly Robust Distributed System*", Slide presentation, 2001 (6 pages).

Dwork, Cynthia, et al., "Pricing via Processing or Combatting Junk Mail", In Ernest F. Brickell, editor, *Advances in Cryptology '92*, vol. 740 of Lecture Notes in Computer Science, Aug. 16-20, 1992, (11 pages).

Ellison, C., et al., "SPKI Certificate Theory", Network Working Group RFC 2693, Internet Society 1999, (pp. 1-34).

Seo et al., *Public-Key Infrastructure for the Secure Border Gateway Protocol* (S-BGP), Jun. 2001.

Kent et al., Secure Border Gateway Protocol (Secure-BGP), Journal on Selected Areas in Communication, 18:4 pp. 582-592 (Apr. 2000).

Wang, et al. *Tracing Based Active Intrusion* Response, North Carolina State University, University of California Davis, http://arqos.csc.ncsu.edu/papers/2001-09-sleepytracing-jiw.pdf, pp. 1-11, 2001.

Mankin et al., *On Design and Evaluation of "Intention-Driven" ICMP Traceback*, Proceedings of the IEEE International Conference on Computer Communications and Networks, pp. 1-16 (Oct. 2001).

Mansfield, et al., *Towards trapping wily intruders in the large*, Elsevier Science, Computer Networks 34 pp. 659-670 (2000).

Chang et al., *Dec1DUonS: Decentralized* Source *Identification for Network-Based Intrusions*, Communications Society Press, pp. 701-714 Ma 1999.

Norton, *Peter Norton's Complete Guide to Networking*, pp. 406-407 (Oct. 1999).

*Decentralized Source Identification for Network-Based Intrusions*, www.proiects.anr.mcnc.org Deciduous, pp. 1-2 (2002).

*Backtracking Spoofed Packets*, www.csm.ornl.gov pp. 1-3 (2002).

Hu, Yih-Chun, et al., "SEAD: Secure Efficient Distance Vector Routing for Mobile Wireless Ad Hoc Networks", *IEEE* WMCSA 2002, Jun. 2002, (11 pages).

Hubaux, Jean-Pierre, et al., "The Quest for Security in Mobile Ad Hoc Networks", in proceedings of the *ACM Symposium on Mobile Ad Hoc Networking and Computing (MobiHOC 2001)*, (10 pages).

Juels, Ari, et al., "Client Puzzles: A Cryptographic Countermeasure Against Connection Depletion Attacks", *NDSS'99* (*Networks and Distributed Security Systems*), Feb. 1999 (15 pages).

Kent, S., et al., "Security Architecture for the Internet Protocol" Network Working Group, *RFC 2401*, Internet Society 1998, (pp. 1-51).

Kent, S., et al., "Secure Border Gateway Protocol (S-BGP)—Real World Performances RFC 2401, Internet Society 1998, (pp. 1-51) and Deployment Issues", *IEEE Journal on Selected* Areas *In Communications*, vol. 18., No. 4, Apr. 2000, (14 pages).

Marti, Sergio, et al., "Mitigating Routing Misbehavior in Mobile Ad Hoc Networks", *ACM* Mobicom 2000, Aug. 2000, ( 11 pages).

Perlman, Radia, "Network Layer Protocols with Byzantine Robustness", Ph.D. Thesis, *Department of Electrical Engineering and Computer Science, MIT*, Aug. 1988, (120 pages) (Best Copy Available).

Savage, Stefan, et al., "Practical Network Support for IP Traceback", *ACMSIGCOMM 2000*, Aug. 2000, (12 pages).

Shamir, Adi, "How to Share a Secret", *Communications of the ACM*, 22:612-613, 1979.

Smith, Bradley, R., et al., "Securing the Borders Gateway Routing Protocol", *Global Internet* 1996, Nov. 1996 (5 pages).

Syverson, P.F., et al., "Towards an Analysis of Onion Routing Security", In H. Federrath, editor, *Designing Privacy Enhancing Technologies, vol. 2009 of LNCS*, 2001, (14 pages).

Perlman, Radia, Brides, Routers, Switches, and internetworking Protocols, *Interconnections Second Edition*, Table of Contents (1999).

Zimmermann, P., "*The Official PGP User's Guide*", Table of Contents, MIT Press (1995).

The Routing Arbiter Project, http:1//www.isi.edu1/div71/ra, Accessed Jun. 1, 2005.

"*Secure BGP Project (S-BGP)*", Introduction, retrieved from http://www.net-tech.bbn.com/sbgp-index.html on May 27, 2005.

Qiu, Lili, et al., "*Fast Firewall Inplementations for Software and Hardware-based Routers*", (2 pages), Jun. 2001.

Qiu, Lili, et al., "*Fast Firewall Inplementations for Software and Hardware-based Routers*", (pp. 1-14), 2001.

Qiu, Lili, et al., Fast Firewall Inplementations for Software and Hardware-based Routers, *IEEE 2001*, pp. 241-250.

Mahajan, Ratul, et al., "*Understanding BGP Misconfiguration*", University of Washington, Slide Presentation, (SIGCOMM '02) (16 pages).

\* cited by examiner

METHOD AND SYSTEM FOR DETECTING A COMMUNICATION PROBLEM IN A COMPUTER NETWORK

CROSS REFERENCE TO RELATED APPLICATION

This application is a division of pending application Ser. No. 10/246,156, entitled METHOD AND SYSTEM FOR DETECTING A COMMUNICATION PROBLEM IN A COMPUTER NETWORK, filed on Sept. 18, 2002.

TECHNICAL FIELD OF THE INVENTION

The invention relates generally to network communications and, more particularly, to detecting communication problems that result from one or more devices failing, either through malfunction or through malice, to properly forward data packets to other devices.

BACKGROUND

Communication problems in computer networks can result in the loss of data, time and money. Such problems stem from a variety of sources. One major source of communication problems is faulty or malicious routing. Faulty routing occurs when a device in a computer network fails, due to a malfunction, to properly forward data packets to other devices in the computer network. On the other hand, malicious routing is when a device in a computer network intentionally fails to forward data packets.

Protocols do exist to facilitate routing in computer networks. For example, one of the protocols currently employed on the Internet to assist devices in properly routing data packets is the Border Gateway Protocol (BGP). However, BGP includes no mechanism for verifying either the authenticity (the correct origin) or the accuracy of the routing information that it distributes. As a result, traffic on a network can be severely disrupted by routers announcing nonexistent routes, or simply failing to withdraw failed routes, as a result of either malfunction or malice. Two approaches have been suggested to solving this problem. One, Secure BGP (S-BGP), requires routing information to be digitally signed, so that routers advertising false routing information can be held accountable when detected. However, the overhead of a digital signature is large and possibly prohibitive, particularly when bringing a failed router back on line, at which time all routing advertisements for that router must be digitally signed at once. Furthermore, the management of the public-key infrastructure (PKI) that allows all routers to validate each other's digital signatures is a daunting task. Moreover, S-BGP does little to help detect or diagnose faulty routing information emanating (accidentally or maliciously) from a router; it only ensures reliable identification of the information's origin (for after-the-fact, out-of-band blame assignment).

Another proposed approach is to maintain a centralized registry of "plausibility" information about routing advertisements, so that blatantly invalid advertisements can be discounted when received. This approach can prevent the most egregious routing problems that arise from router misconfigurations, but it is still vulnerable to a wide range of both inadvertent and malicious false advertisements for routes that a particular router may be "entitled" to advertise, but cannot in fact serve.

SUMMARY

In accordance with the foregoing, a method and system for detecting a communication problem in a computer network is provided. According to the invention, a computer in the network runs a verification procedure in which it sends data packets to another computer in the network. Some or all of the data packets contain, either individually or collectively, a secret piece of information, such as a secret code. The computer then makes a determination regarding the network links between it and the other computer. If, for example, the other computer is able to respond by providing the secret piece of information back, then the computer sending the data packets concludes that the devices along the network links en route to the other computer are properly forwarding data packets.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION

The invention is generally directed to a method and system for detecting a communication problem on a computer network. The invention can be used in a variety of contexts. For example, the invention can be used to detect faulty or malicious routing in a network. According to various embodiment of the invention, a computer tests network links by transmitting data packets to a receiving computer over the network links. The data packets, either individually or collectively, contain a piece of information that is secret, both in terms of its existence and in terms of its content. The secret piece of information may take a variety of forms. For example, the secret piece of information may be the number of data packets that contain a secret code, or the secret piece of information may be a large number that can only be derived if the receiving computer knows a certain algorithm and is able to receive at least a certain percentage of the data packets. The computer sending the data packets then makes a determination regarding the network links based on the response that the receiving computer sends back. If, for example, the receiving computer is able to reconstruct the secret piece of information and transmit it back, the computer concludes that the devices en route to the receiving computer are properly forwarding data packets.

Prior to proceeding with a description of the various embodiments of the invention, a description of the computer and networking environment in which the various embodiments of the invention may be practiced will now be provided. Although it is not required, the present invention may be implemented by programs that are executed by a computer.

Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
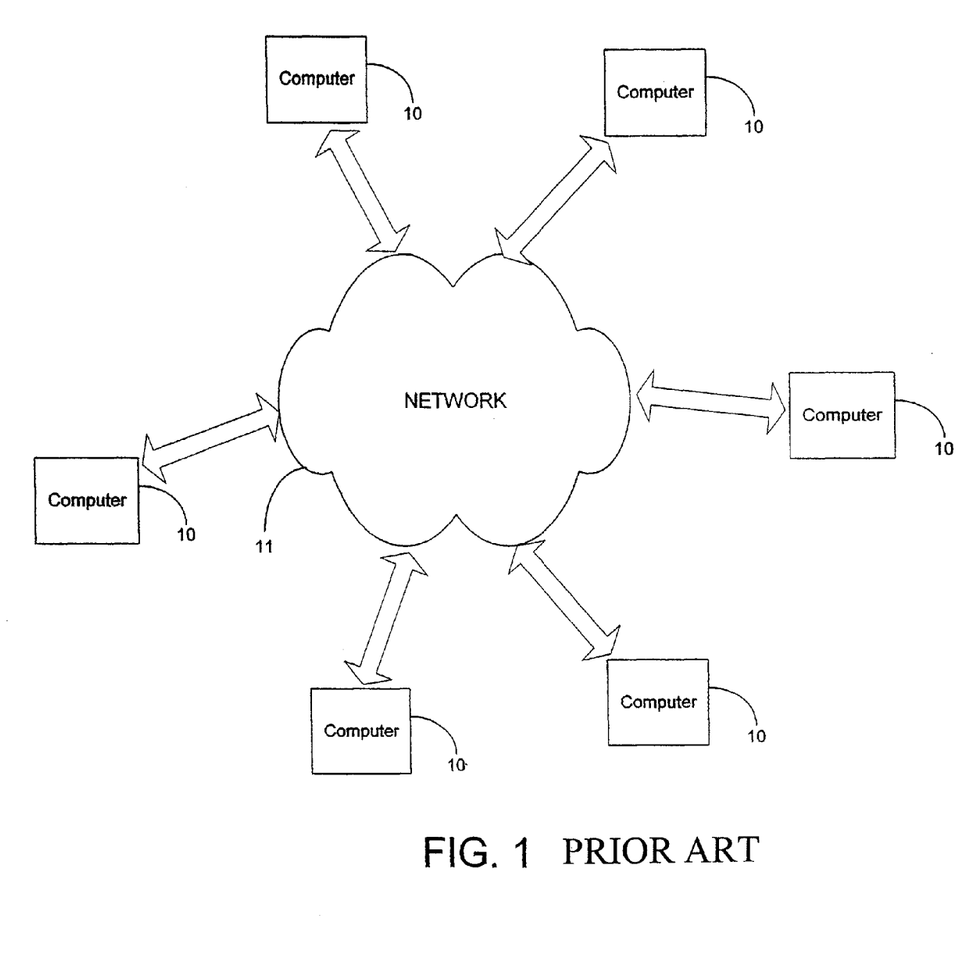
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another or the network 11, one or more of the computers may act as clients, servers or peers with respect to other computers. Accordingly, the various embodiments of the invention may be practiced on clients, servers, peers or combinations thereof, even though specific examples contained herein do not refer to all of these types of computers.

Figure 2:
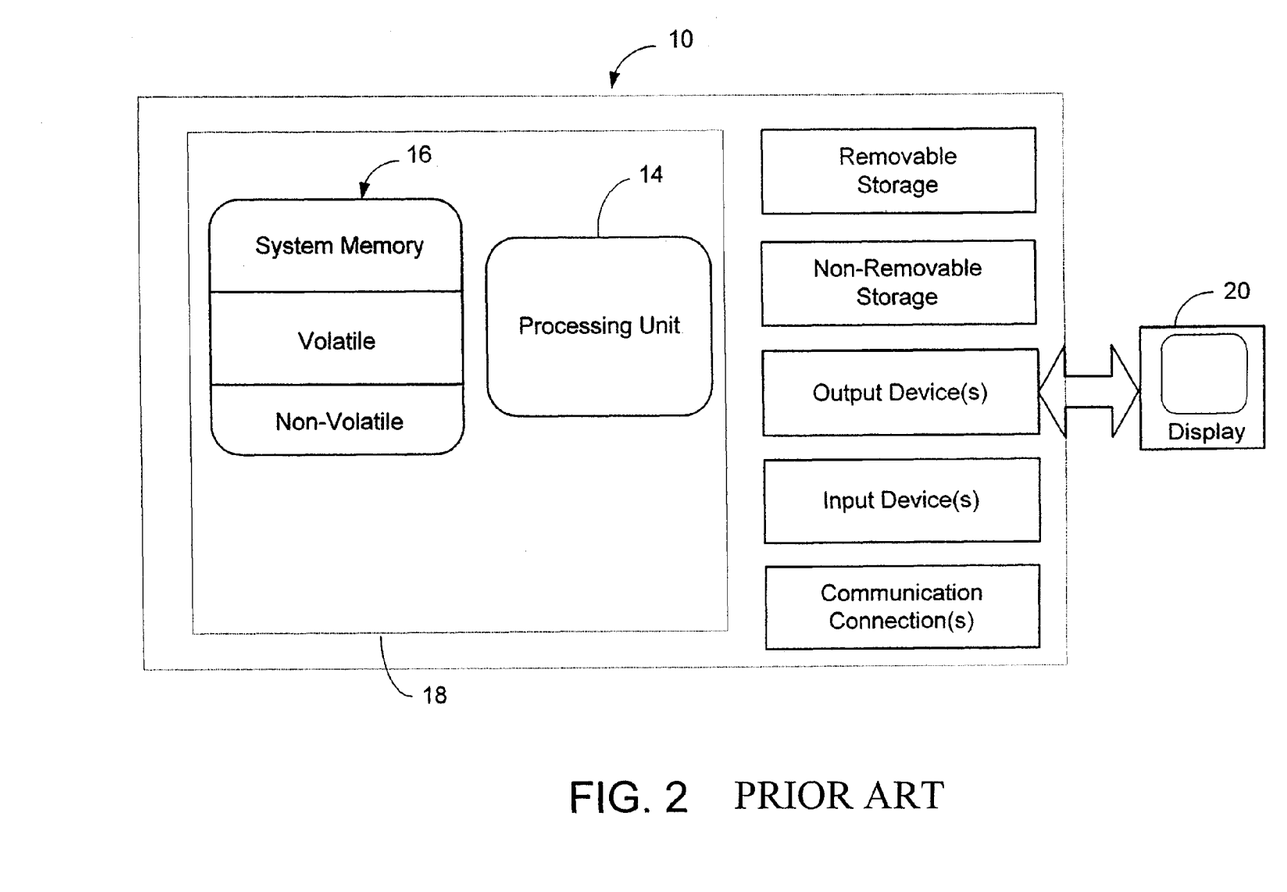
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to store the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

Figure 3:
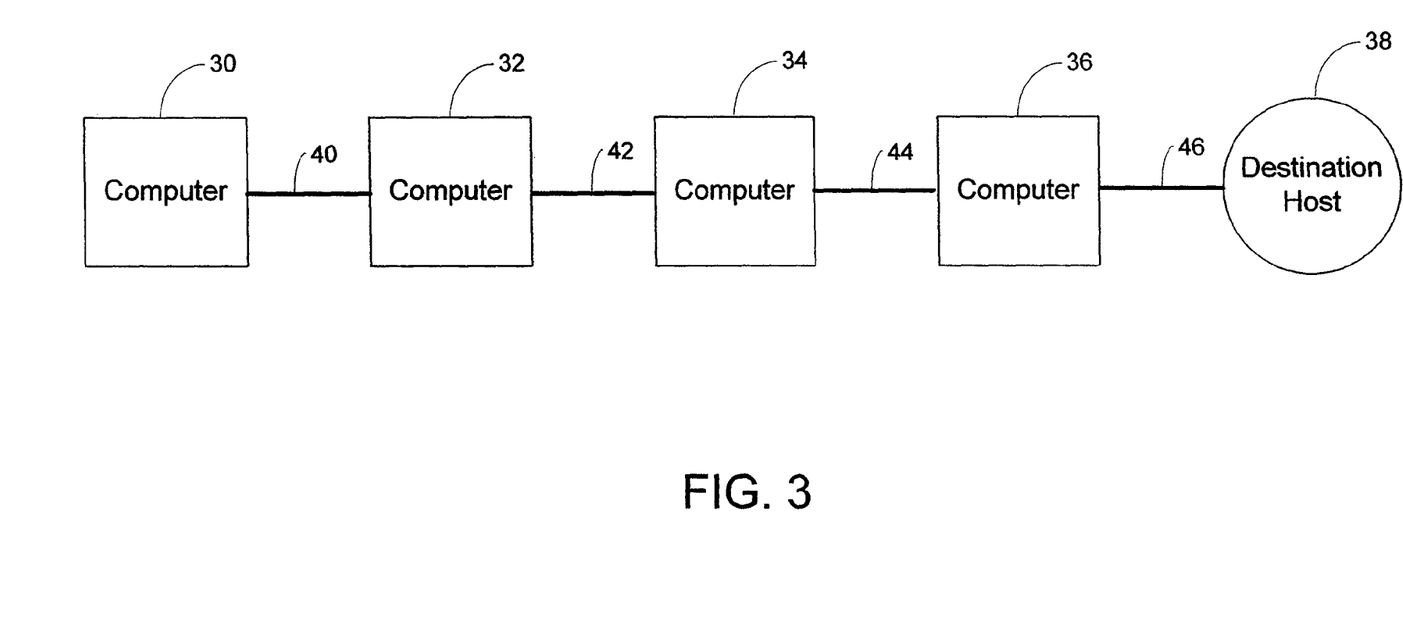
FIG. 3 illustrates a network on which a verification procedure may be performed according to an embodiment of the invention.

Turning to the invention, reference is made to FIG. 3, in which a computer network is shown. The computer network includes a first computer 30, a second computer 32, a third computer 34, and a fourth computer 36. The computer network also includes a destination host 38, which is, itself, a computer. The first computer 30 communicates with the second computer 32 via a network link 40. The second computer 32 communicates with the third computer 34 via a network link 42. The third computer 34 communicates with the fourth computer 36 via a network link 44. Finally, the fourth computer 36 communicates with the destination host 38 via a network link 46.

Each of the network links 40-46 of FIG. 3 may include a variety of types of communication media. Also, each of the computers of FIG. 3 is considered to be a part of each link to which it is adjacent. For example, the first computer 30 and the second computer 32 are each considered to be end nodes on the link 40 between them. Similarly, the second computer 32 and the third computer 34 are each considered to be end nodes on the link 42 between them. Furthermore, the third computer 34 and the fourth computer 36 are each considered to be end nodes on the link 44 between them. Finally, the fourth computer 36 and the destination host 38 are each considered to be end nodes on the link 46 between them. Each of the network links 40-46 may also include other, intermediate computers that are not illustrated in FIG. 3.

According to an embodiment of the invention, the first computer 30 verifies whether each of the network links 40 - 46 between itself and the destination host 38 are functioning by performing a verification procedure. This verification procedure will now be described. First, the first computer 30 establishes a secure communication session with the second computer 32. The first computer 30 then indicates to the second computer 32 what information the second computer 32 needs to give to the first computer 30 in order to convince the first computer 30 that the second computer 32 is properly receiving data packets from the first computer 30. In various embodiments of the invention, the information that the first computer 30 requires from the second computer 32 is secret. That is, the information cannot easily be discovered or computed by a third party. The first computer 30 then sends a stream of data packets to the second computer 32. The second computer 32 analyzes information contained in the stream of packets and, based on the analysis, attempts to construct a correct response to the stream of packets. The second computer 32 then transmits what it believes to be the correct response back to the first computer 30. If the response is correct, the first computer 30 deems the link 40 between the first computer 30 and the second computer 32 not to have any problems. In addition to the response, the second computer 32 informs the first computer 30 regarding the identity of the next computer on the way to the host, which, in this case, is the third computer 34. The first computer 30 repeats this procedure with each subsequent computer in FIG. 3, until it has executed the procedure with the third computer 34, the fourth computer 36 and the destination host 38, or until it encounters a problem. If the first computer 30 encounters a problem with one of the other computers, it deems the link between that computer and the computer immediately preceding it to have a problem. For example, if the first computer 30 does not receive a correct response to a stream of data packets from the third computer 34, the first computer will designate the link 42 between the second and third computers to be a problem. Similarly, if the first computer 30 does not receive a correct response to a stream of data packets from the destination host 38, the first computer will designate the link 46 between the destination host 38 and the fourth computer 36 to be a problem.

Referring again to FIG. 3, and to the previous description, the stream of data packets sent by the first computer 30 does not have to originate from the first computer 30 itself, but may include packets that the first computer 30 received from another source, which are simply being forwarded by the first computer 30. In an embodiment of the invention, the first computer 30 receives many data packets that are a part of the normal network data traffic, and identifies a subset of the packets based on some special property that the subset has - either a collective property, or a property that each individual data packet of the subset has - and forwards all of the data packets, including the subset, to the other computers of the network. Each of the other computers is then expected to be able to reconstruct the secret piece of information based on the special property of the subset of data packets.

There are many possible variations in the verification procedure described above. For example, instead of starting with the second computer 32, the first computer 30 could start at the destination host 38 and work its way back.

There are also a variety of ways in which the first computer 30 can determine whether it receives a correct response from one of the other computers 30 through 38, depending on how the invention is implemented. Some example implementations will now be given, and, for the sake of clarity, will be described in the context of the first computer 30 executing the verification procedure with the third computer 34. It will be assumed that the first computer 30 has already determined that the link 40 between the first computer 30 and the second computer 32 is not experiencing problems.

In one implementation, the first computer establishes a secure communication session with the third computer 34 and, during the secure communication session, gives the third computer a secret code that the third computer 34 needs to look for in future packets as well as an algorithm that the third computer needs in order to perform an analysis of the data packets having the secret code. The code might be as simple as a bit pattern, or as complex as $R_n$ (mod P), where $R_n$ is one of a list of n randomly generated numbers that the first computer 30 gives to the third computer 34 and P is some prime number that the first computer 30 also gives to the third computer 34. The first computer 30 then ends the secure communication session with the third computer 34. Subsequently, the first computer 30 transmits a stream of data packets to the third computer 34, a random number of which contain the code. The first computer may, but need not, create the packets having the secret code. In one embodiment, the first computer identifies data packets that it received in the normal data traffic and that happen to have the secret code, performs an analysis on those data packets using the algorithm, saves the result of the algorithm as a predetermined "correct" answer, and forwards the identified data packets along with all of the other data packets to the third computer 34 via the second computer 32. Upon receiving the data packets, the third computer 34 uses the algorithm it received from the first computer 30 to perform some sort of analysis, such as a probabilistic, statistical or cryptographic analysis, on those data packets having the secret code. For example, the algorithm may require the third computer 34 to compute a cryptographic checksum on a concatenation of all of the packets having the secret code. An example of an algorithm that may be used for this purpose is the secure hash algorithm SHA-1. The third computer 34 returns the result of its analysis to the first computer 30. The first computer 30 compares the result returned by the third computer 34 with the predetermined "correct" result. If the two values match, or are within an acceptable margin of error of one another, then the first computer deems the link 42 between the second computer 32 and the third computer 34 not to have problems. If the two values do not match or are outside an acceptable margin of error with respect to one another, then the first computer 30 designates the link 42 to have a problem. If the first computer 30 has to repeat this procedure with one of the other computers as when, for example, it does not find a problem with the link 42 between the second computer 32 and the third computer 34, the first computer 30 chooses a different code. For example, if the first computer 30 used the bit pattern 0011 as the code when carrying out the procedure with the third computer 34, it might use the bit pattern 1101 when carrying out the procedure with the fourth computer 36, and the bit pattern 1111 when carrying out the procedure with the destination host 38. The code could be in a particular field as specified by a security procedure known to both the first and second computers. For example, the first computer 30 might instruct the second computer 32 to look for the code in an unused portion of the IP header. In another example, it could be understood beforehand by both the first computer 30 and the second computer 32 that the code that the first computer 30 provides to the second computer 32 during the secure communication session is to be looked for in the first byte of the payload portion of the data packet.

In another implementation, the first computer 30 instructs the third computer 34, during the secure communication session, how to reconstruct a secret piece of information, such as a 128-bit number, that is distributed among the data packets of the stream. For example, the first computer 30 might give the third computer 34 an algorithm for doing so. The first computer 30 then breaks the piece of information down into parts, distributes those parts among multiple data packets, and sends the data packets to the third computer 34. The first computer then awaits a response from the third computer 34. The third computer 34, if it receives the data packets, extracts the constituent parts of the secret piece of information, reconstructs the secret piece of information, and transmits a response containing the secret piece of information to the first computer 30. If the response is correct, i.e. contains a correct value for the secret piece of information, the first computer 30 determines that the link 42 between the second computer 32 and the third computer 34 is not experiencing problems. The nature of the secret piece of information may be such that it can be reconstructed with a certain percentage of the data packets. For example, the secret piece of information may be of a type that the third computer 34 can reconstruct if it receives 85% of the data packets. In some embodiments, the percentage of data packets needed to reconstruct the secret piece of information is between and inclusive of about 80% and about 90%.

The verification procedure described in conjunction with FIG. 3 can be used in a variety of contexts. According to an embodiment of the invention, the verification procedure is used by a router as part of an investigation to determine whether or not there are any problems in various links of a network. An example of the overall steps that a router takes during the course of such an investigation will now be described with reference to the flowchart of FIG. 4. At step 50, the router receives complaints from other computers on the network regarding a particular destination computer on the network. These complaints may take a variety of forms. For example, in standard TCPIP communication, if an end host detects an end-to-end performance problem when sending data packets to a particular destination, it sets a "complaint bit" in subsequent data packets sent to that destination. Thus, one way in which the router recognizes complaints at step 50 is by observing data packets that pass through it, that are bound for a particular destination and that also have the complaint bit set.

Figure 4:
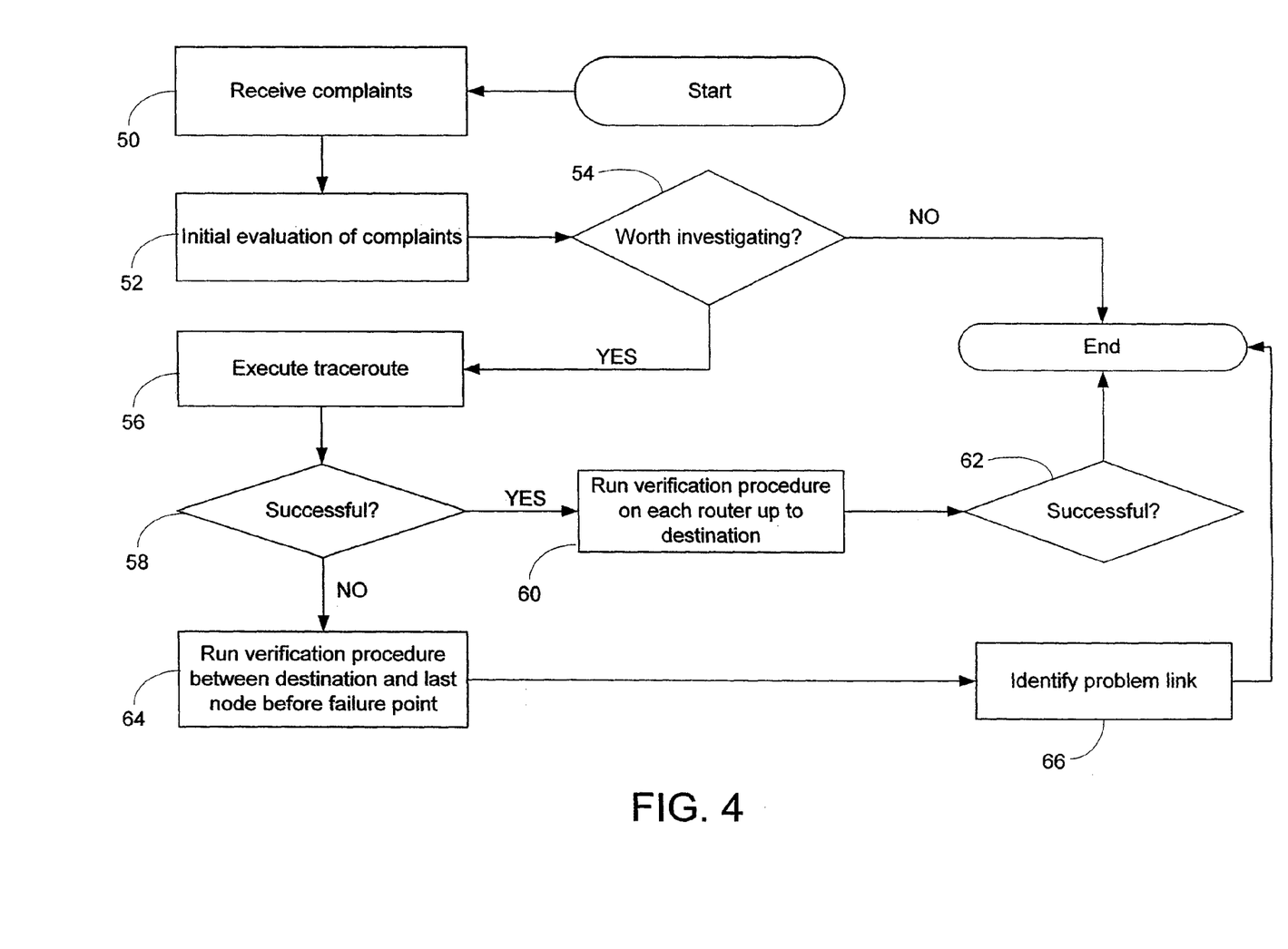
FIG. 4 illustrates a procedure that is followed when a router conducts an investigation in accordance with an embodiment of the invention.

At step 52, the router conducts an initial evaluation of the complaints. As part of this initial evaluation, the router uses some sort of mechanism to determine whether or not some or all of the complaints are real or are being faked. If the router determines that a sender of a complaint is, for example, setting a complaint bit in order to mislead, then the router takes no action regarding that sender's complaint and ignores future complaints from that sender. The router also evaluates the total volume of complaints from all sources. For example, if a router receives complaints from only a small fraction of end users attempting to reach a particular destination address, the router may choose to ignore those complaints as anomalous. If, at step 54, the router determines that the complaints are not worth investigating, then the overall investigation ends. Otherwise, if most or all traffic sent to a particular destination suggests that there is a routing problem, the router will continue with the investigation at step 56.

At step 56, the router executes a traceroute procedure, sending traceroute packets to the destination that is the subject of the complaints. Traceroute is a well-known procedure and, while there are several variations, it basically involves sending a traceroute packet to the first host that is upstream of the sender (the router is the sender, in this example). The traceroute packet may be implemented as a normal UDP or ICMP packet with a limited time-to-live (TTL). The first upstream host responds to the sender by confirming that it has received the traceroute packet. The first upstream host also decrements the TTL and forwards the traceroute packet to the next upstream host. The next upstream host performs the same steps as the first upstream host. This process is repeated until the traceroute packet reaches the destination, or until its TTL reaches zero. When the TTL reaches zero, the next host receiving the traceroute packet generates an ICMP response that enables the router to discover the presence of that host. If, at step 58, the router determines that the traceroute procedure is successful, then the investigation proceeds to step 60. At step 60, the router executes a verification procedure with each of the upstream routers on each of the hops that it knows about between itself and the destination. This verification procedure is executed in accordance with the invention, examples of which were described in conjunction with FIG. 3. If, at step 62, the router determines that the verification procedure is successful with respect to each of the upstream routers on which the verification procedure is performed, then the investigation is complete, and the router concludes that it cannot accurately identify the link in the network that is having the problem.

Referring back to step 58, if the router determines that the traceroute procedure has failed, the investigation proceeds to step 64. At step 64, the router executes a verification procedure on the first upstream router that failed to respond properly to the traceroute packet. Again, this verification procedure is executed in accordance with the invention, examples of which were described in conjunction with FIG. 3. The verification procedure is used to confirm the results of the traceroute procedure. The investigation then proceeds to step 66. At step 66, the router deems the link between the last router that responded properly to the verification procedure and the first router that failed to respond properly to be the problem link. The investigation then ends, and the router is free to take corrective action, such as by routing around the link that is determined to be a problem.

Figure 5:
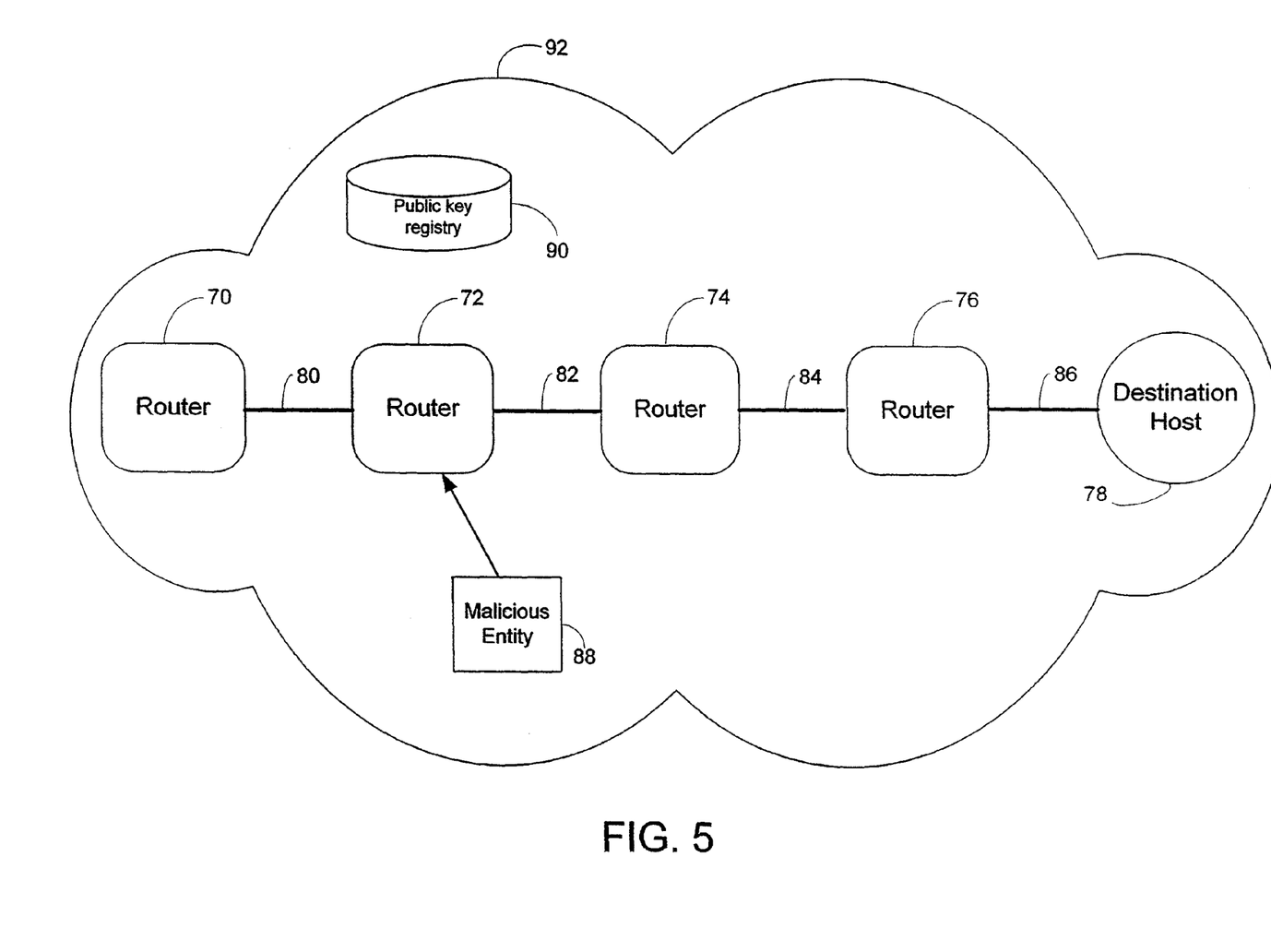
FIG. 5 illustrates an example of a network on which a router may conduct an investigation in accordance with an embodiment of the invention.

An example of a scenario in which an embodiment of the invention is used will now be described with reference to FIG. 5 and with parenthetical reference to the corresponding steps of the flowchart of FIG. 4. In this example, a computer network 92 includes a first router 70, a second router 72, a third router 74, and a fourth router 76. The network 92 also includes a destination host 78, which is, itself, a computer, and a public key registry 90, which contains the public key of each router in the network 92. Each of the routers represents a routing hop to the destination host 78. Thus, there are four routing hops shown from the first router 70 to the destination host 78. The first router 70 communicates with the second router 72 via a network link 80. The second router 72 communicates with the third router 74 via a network link 82. The third router 74 communicates with the fourth router 76 via a network link 84. Finally, the fourth router 76 communicates with the destination host 78 via a network link 86. As in the network of FIG. 3, each network link shown in FIG. 5 includes the two nodes on either side of it and may include other computers that are not shown. It is assumed in this example that the second router 72 has been taken over by a malicious entity, labeled 88, which does not forward data packets to other nodes on the network 92, but which permits the second router 72 to respond correctly to traceroute packets sent to it, and even to mimic appropriate responses to traceroute packets sent to other entities. It is also assumed in this example that the first router 70 has received complaints from other routers in the network 92 regarding the destination host 78(step 50). The first router 70 conducts an initial evaluation of the complaint (step 52). Based on the initial evaluation, the first router 70 determines whether or not to conduct a further investigation (step 54). If the first router 70 determines that further investigation is not warranted, the procedure ends. Otherwise, the first router 70 executes a traceroute procedure for the destination host 78. As part of the traceroute procedure, the first router 70 sends traceroute packets to the second router 72. The second router 72 responds appropriately to the traceroute packets, and generates a set of bogus traceroute responses that mimics the responses that would be expected from the third router 74, the fourth router 76 if the links 82, 84 and 86 between the second and third routers, the third and fourth routers, and between the fourth router and the destination host were functioning correctly. The first router 70 therefore determines that the traceroute procedure has succeeded (step 58). The first router 70 then initiates a verification procedure in accordance with an embodiment of the invention (step 60). The first router 70 looks up the public key of the second router 72 in the public key registry 90. Using the second router's public key, the first router 70 establishes a secure communication session with the second router 72. The first router 70 then gives an algorithm to the second router 72 and indicates to the second router 72 that the second router 72 needs to perform the algorithm using all data packets that it receives from the first router 70 that have the code 1101 in the most significant half of the first byte of payload. The first router 70 then terminates the secure session with the second router 72, and sends the second router 72 a stream of 300 data packets, 100 of which have the code. The second router 72 correctly performs the algorithm on the 100 coded data packets, and replies to the first router 70 with the correct response. The first router 70 determines, based on the response, that the link 80 between the first router 70 and the second router 72 is not experiencing any problems.

Continuing the verification procedure, the first router 70 looks up the public key of the third router 74 in the public key registry 90. Using the third router's public key, the first router 70 attempts to establish a secure communication session with the third router 74. The second router 72, still under the control of the malicious entity 88, and recognizing that first router 70 is attempting to establish a secure communication session with the third router 74, permits the data packets that are involved in the secure communication session to reach the third router 74. The second router 72 also permits the third router 74 to respond to the first router 70 during the secure communication session, so as not to arouse suspicion. The first router 70 then gives an algorithm to the third router 78 and indicates to the third router 74 that the third router 74 needs to perform the algorithm using all data packets that it receives from the first router 70 that have the code 1111 in the most significant half of the first byte of payload. The first router 70 then terminates the secure session with the third router 74. The second router 72, under the control of the malicious entity 88, ceases forwarding data packets. The first router 70 sends the third router 74 a stream of 300 data packets, 50 of which have the code 1111. These data packets never reach the third router 74. Furthermore, the second router 72, not having been privy to the content of the secure communication session between the first router 70 and the third router 74, does not know which data packets of the 300 are significant to the third router 74, or what to do with the packets, and is not able to mimic an appropriate response. The first router 70 determines, based on the lack of response from the third router 74 (or an incorrect bogus response from the second router 72), that the verification procedure has failed (step 62). Based on the point of failure, the first router 70 determines that the link 82 between the second router 72 and the third router 74 is experiencing problems (step 66). The first router 70 then takes corrective action, such sending future data packets to the third router 74 via a new route that excludes the link 82 between the second router 72 and the third router 74.

Although several examples of how the invention may be implemented have been described, there are many other variations possible. The variation employed may depend on a variety of factors, such as the type of malicious attack expected. For example, a malicious router may adjust its disruptive behavior so as to avoid detection. It may, for example, confine its attacks to periods of time where it does not detect any attempts to initiate the verification procedure described above (i.e., does not detect key exchange packets from upstream routers). According to an embodiment of the invention, routers wishing to thwart this attack can give occasional indications that they are initiating the verification procedure (such as by sending key exchange packets—whether real or bogus) whenever there is any hint of a problem. Since the malicious router cannot distinguish real verification attempts from fictitious ones (beyond detecting the presence or absence of key exchanges), the presence of such simulations should ensure that misbehavior occurs either at such times when it can be detected by the verification procedure, or else not at all. Alternatively, the malicious router may attempt to interfere with the verification procedure by selectively blackholing (dropping) the packets used in the key exchange phase, so as to give the impression that a router further downstream is not accepting key exchanges (and hence is either malfunctioning or malicious). This attack cannot be used by a single misbehaving router to frame a router further downstream. The reason for this is the following: if the misbehavior affects normal traffic, then the verification procedure will correctly detect a misbehaving link when the (honest) router immediately downstream of the adversary on the path reports the anomalous traffic pattern. However, two misbehaving routers could collude to frame a router between them on a path as follows: the downstream confederate disrupts traffic, while the upstream one disrupts key exchanges to the victim router so as to implicate it. A countermeasure to this attack that may be used in an embodiment of the invention (if multiple colluding routers are deemed a threat, and if redundant routes are not being used to effect the key exchange) is to use so-called "onion routing"-style encryption of key exchange messages. In onion routing, each router that receives a message is able to decrypt just enough information to determine the next router to which the message is to be forwarded, but is not able to determine the destination of any further hops. Since the verification procedure described above involves a key exchange with each router along the path to the destination, the key exchange traffic can be encrypted hop by hop, so that each router along the route does not know the final destination of the message (and therefore cannot consistently frame a single router).

It can thus be seen that a new and useful method and system for detecting a communication problem in a computer network has been provided. In view of the many possible embodiments to which the principles of this invention may be applied, it should be recognized that the embodiments described herein with respect to the drawing figure is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method for verifying a network link, the method comprising:

receiving, at a receiving computer, a plurality of data packets from a sending computer over the network link, the network link including an intermediate computer, the plurality of data packets being forwarded by the intermediate computer to the receiving computer;

receiving, by the receiving computer during a secure communication session with the sending computer, an algorithm for reconstructing a secret piece of information from parts of the secret piece of information distributed among the plurality of data packets;

reconstructing, by the receiving computer, the secret piece of information using the parts of the secret information distributed among the plurality of received data packets and using the algorithm received from the sending computer; and transmitting, by the receiving computer, the reconstructed secret piece of information back to the sending computer, thereby verifying to the sending computer that the intermediate computer is properly forwarding data packets to the receiving computer.

2. The method of claim 1,
wherein reconstructing comprises extracting parts of a secret number from the plurality of data packets and reconstructing the secret number; and
wherein transmitting comprises transmitting the secret number.

3. A computer-readable storage device having stored thereon computer-executable instructions for performing the method of claim 1.

4. A method for verifying a network link, comprising:
sending a plurality of data packets from a sending computer over the network link, the network link including an intermediate computer, the plurality of data packets being forwarded by the intermediate computer to a receiving computer, a secret piece of information being distributed among the plurality of data packets;
sending, by the sending computer during a secure communication session with the receiving computer, an algorithm for reconstructing the secret piece of information from parts of the secret piece of information distributed among the plurality of data packets; and
the sending computer receiving from the receiving computer the secret piece of information, reconstructed by the receiving computer using the parts of the secret piece of information distributed among the plurality of data packets and using the algorithm received from the sending computer, thereby verifying to the sending computer that the intermediate computer is properly forwarding data packets to the receiving computer.

5. A computer-readable storage device having stored thereon computer executable instructions for performing the method of claim 4.

6. A method for verifying a network link, comprising:
transmitting a plurality of data packets containing a secret piece of information from a sending computer over the network link to a receiving computer, the network link including an intermediate computer, the plurality of data packets being forwarded by the intermediate computer to the receiving computer;
transmitting from the sending computer to the receiving computer, in a secure communication session, an algorithm for reconstructing the secret piece of information from parts of the secret piece of information distributed among the plurality of data packets;
the receiving computer reconstructing the secret piece of information using the parts of the secret information distributed among the plurality of data packets, and using the algorithm received from the sending computer;
the receiving computer transmitting the reconstructed secret piece of information back to the sending computer; and
the sending computer verifying that the intermediate computer is properly forwarding data packets to the receiving computer based on the secret piece of information.

7. The method of claim 6, wherein reconstructing comprises extracting parts of a secret number from the plurality of data packets and reconstructing the secret number, and wherein transmitting the reconstructed secret piece of information comprises transmitting the secret number.

8. A computer-readable storage device having stored thereon computer-executable instructions for performing the method of claim 6.

* * * * *